(12) United States Patent
Eftekhari et al.

(10) Patent No.: US 11,217,847 B2
(45) Date of Patent: Jan. 4, 2022

(54) POLYMER-BASED ENCLOSURE ASSEMBLIES FOR ELECTRIFIED VEHICLE BATTERY PACKS

(71) Applicant: Ford Global Technologies, LLC, Dearborn, MI (US)

(72) Inventors: Mohammadreza Eftekhari, Northville, MI (US); Kyle Krueger, Dearborn, MI (US); Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 399 days.

(21) Appl. No.: 15/965,349

(22) Filed: Apr. 27, 2018

(65) Prior Publication Data

US 2019/0334136 A1 Oct. 31, 2019

(51) Int. Cl.
| | |
|---|---|
| *H01M 50/20* | (2021.01) |
| *H01M 10/42* | (2006.01) |
| *H01M 10/6554* | (2014.01) |
| *H01M 10/625* | (2014.01) |
| *H01M 50/24* | (2021.01) |
| *H01M 50/242* | (2021.01) |
| *H01M 50/207* | (2021.01) |

(52) U.S. Cl.
CPC ......... *H01M 50/20* (2021.01); *H01M 10/425* (2013.01); *H01M 10/4207* (2013.01); *H01M 10/625* (2015.04); *H01M 10/6554* (2015.04); *H01M 50/207* (2021.01); *H01M 50/24* (2021.01); *H01M 50/242* (2021.01); *H01M 2010/4271* (2013.01); *H01M 2220/20* (2013.01)

(58) Field of Classification Search
CPC ......... H01M 2/10–1094; H01M 50/20; H01M 50/24; H01M 50/242
See application file for complete search history.

(56) References Cited

U.S. PATENT DOCUMENTS

| | | |
|---|---|---|
| 5,378,555 A | 1/1995 | Waters et al. |
| 5,639,571 A | 6/1997 | Waters et al. |
| 2005/0153195 A1* | 7/2005 | Han ................... H01M 50/572 429/59 |
| 2009/0061301 A1* | 3/2009 | Planck ................ H01M 50/529 429/160 |

(Continued)

FOREIGN PATENT DOCUMENTS

| | | |
|---|---|---|
| JP | H06243889 A | 9/1994 |
| JP | 2017516263 A | 6/2017 |
| KR | 20170032098 A * | 3/2017 |

OTHER PUBLICATIONS

Machine Translation of KR20170032098 from EPO originally published to Choi et al. Mar. 22, 2017 (Year: 2017).*

*Primary Examiner* — Matthew J Merkling
(74) *Attorney, Agent, or Firm* — David B. Kelley; Carlson, Gaskey & Olds

(57) ABSTRACT

This disclosure details exemplary battery pack designs for use in electrified vehicles. Exemplary battery packs may include a polymer-based enclosure assembly having features for both retaining components and transferring loads inside the battery pack. The battery packs may include one or more snap-in features for retaining the components and one or more foam spacers for separating adjacent battery arrays and establishing a load transfer path inside the battery pack.

20 Claims, 8 Drawing Sheets

(56) References Cited

U.S. PATENT DOCUMENTS

| | | | |
|---|---|---|---|
| 2011/0064987 A1* | 3/2011 | Ogasawara | H01M 50/502 429/121 |
| 2011/0111649 A1* | 5/2011 | Garascia | H01M 50/20 439/890 |
| 2012/0183823 A1* | 7/2012 | Von Borck | H01M 10/625 429/81 |
| 2013/0037336 A1* | 2/2013 | Ojeda | H01M 50/502 180/68.5 |
| 2013/0244089 A1* | 9/2013 | Shimizu | H01M 2/1077 429/176 |
| 2014/0113165 A1* | 4/2014 | Silk | H01M 2/0245 429/61 |
| 2014/0272501 A1* | 9/2014 | O'Brien | B60L 50/64 429/90 |
| 2014/0335401 A1* | 11/2014 | Wohrle | H01M 10/0525 429/163 |
| 2015/0132622 A1 | 5/2015 | Gohl et al. | |
| 2015/0280293 A1* | 10/2015 | Guignard | H01M 2/1072 429/120 |
| 2015/0300778 A1* | 10/2015 | Monturo | F41C 33/06 206/317 |
| 2017/0317332 A1 | 11/2017 | DeKeuster et al. | |
| 2018/0287112 A1* | 10/2018 | Juventin | H01G 11/18 |

* cited by examiner

POLYMER-BASED ENCLOSURE ASSEMBLIES FOR ELECTRIFIED VEHICLE BATTERY PACKS

TECHNICAL FIELD

This disclosure relates to electrified vehicle battery packs, and more particularly to polymer-based battery pack enclosure assemblies that include features for both retaining components and transferring loads inside the battery pack.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery cells that store energy for powering these electrical loads. Various other internal components, including but not limited to a battery electric control module (BECM), a bussed electrical center (BEC), wiring, and I/O connectors, must also be housed inside the enclosure assembly. The enclosure assembly must also function to transfer loads in response to vehicle impact and durability events.

SUMMARY

A battery pack according to an exemplary aspect of the present disclosure includes, among other things, an enclosure assembly including a tray and a cover, and a first foam spacer secured to the tray.

In a further non-limiting embodiment of the foregoing battery pack, the tray is an expanded polymer-based tray and the cover is a solid polymer-based cover.

In a further non-limiting embodiment of either of the foregoing battery packs, the enclosure assembly includes a mid-tray.

In a further non-limiting embodiment of any of the foregoing battery packs, a plurality of internal components are secured within the mid-tray to establish an electrical subassembly within the enclosure assembly.

In a further non-limiting embodiment of any of the foregoing battery packs, the plurality of internal components include a bussed electrical center (BEC) secured within a first pocket of the mid-tray and a battery electric control module (BECM) secured within a second pocket of the mid-tray.

In a further non-limiting embodiment of any of the foregoing battery packs, the BEC and the BECM are retained in an X-axis direction and a Y-axis direction by pocket walls of the mid-tray and are retained in a Z-axis direction by protrusions that protrude inwardly from the pocket walls.

In a further non-limiting embodiment of any of the foregoing battery packs, the enclosure assembly includes a mid-tray, and the mid-tray is secured and sealed to the tray by a tongue and groove connection.

In a further non-limiting embodiment of any of the foregoing battery packs, a second foam spacer is located between a first battery array assembly and a first side wall of the tray, and a third foam spacer is located between a second battery array assembly and a second side wall of the tray.

In a further non-limiting embodiment of any of the foregoing battery packs, a fourth foam spacer is located between a first battery array and a second battery array of the first battery array assembly, and a fifth foam spacer is located between a third battery array and a fourth battery array of the second battery array assembly.

In a further non-limiting embodiment of any of the foregoing battery packs, a second foam spacer is located between a first battery array and a second battery array of a first battery array assembly, and a third foam spacer is located between a third battery array and a fourth battery array of a second battery array assembly.

In a further non-limiting embodiment of any of the foregoing battery packs, a first battery array assembly is retained to the tray by a first protrusion of the tray, and a second battery array assembly is retained to the tray by a second protrusion of the tray.

In a further non-limiting embodiment of any of the foregoing battery packs, a first heat exchanger plate of the first battery array assembly is snap-fit into place under the first protrusion and a second heat exchanger plate of the second battery array assembly is snap-fit under the second protrusion to retain the first and second battery array assemblies in a Z-axis direction.

In a further non-limiting embodiment of any of the foregoing battery packs, the tray includes a beam that protrudes upwardly from a floor of the tray, the beam including a protrusion that extends into a slot of the first foam spacer to retain the first foam spacer to the tray.

In a further non-limiting embodiment of any of the foregoing battery packs, the first foam spacer is push-retained to the tray.

In a further non-limiting embodiment of any of the foregoing battery packs, the first foam spacer is located between adjacent battery arrays, between a battery array and a wall of the tray, or between adjacent battery array assemblies.

A method according to another exemplary aspect of the present disclosure includes, among other things, securing a first spacer to a tray of a battery pack enclosure assembly, securing a first battery array assembly to the tray, and securing a second battery array assembly to the tray. The first spacer fills a gap extending between the first battery array assembly and the second battery array assembly.

In a further non-limiting embodiment of the foregoing method, the method includes securing a second spacer between the first battery array assembly and a first side wall of the tray and securing a third spacer between the second battery array assembly and a second side wall of the tray.

In a further non-limiting embodiment of either of the foregoing methods, the method includes securing a second spacer between a first battery array and a second battery array of the first battery array assembly and securing a third spacer between a third battery array and a fourth battery array of the second battery array assembly.

In a further non-limiting embodiment of any of the foregoing methods, securing the first battery array assembly and the second battery array assembly to the tray includes snap-fitting a first heat exchanger plate of the first battery array assembly into place under a first protrusion of the tray and snap-fitting a second heat exchanger plate of the second battery array assembly into place under a second protrusion of the tray.

In a further non-limiting embodiment of any of the foregoing methods, securing the first spacer to the tray includes pushing the first spacer onto a protrusion that extends from a floor of the tray.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs may include a polymer-based enclosure assembly having features for both retaining components and transferring loads inside the battery pack. The battery packs may include one or more snap-in features for retaining the components and one or more foam spacers for separating adjacent battery arrays and establishing a load transfer path inside the battery pack. These and other features are discussed in greater detail in the following paragraphs of this detailed description.

Figure 1:
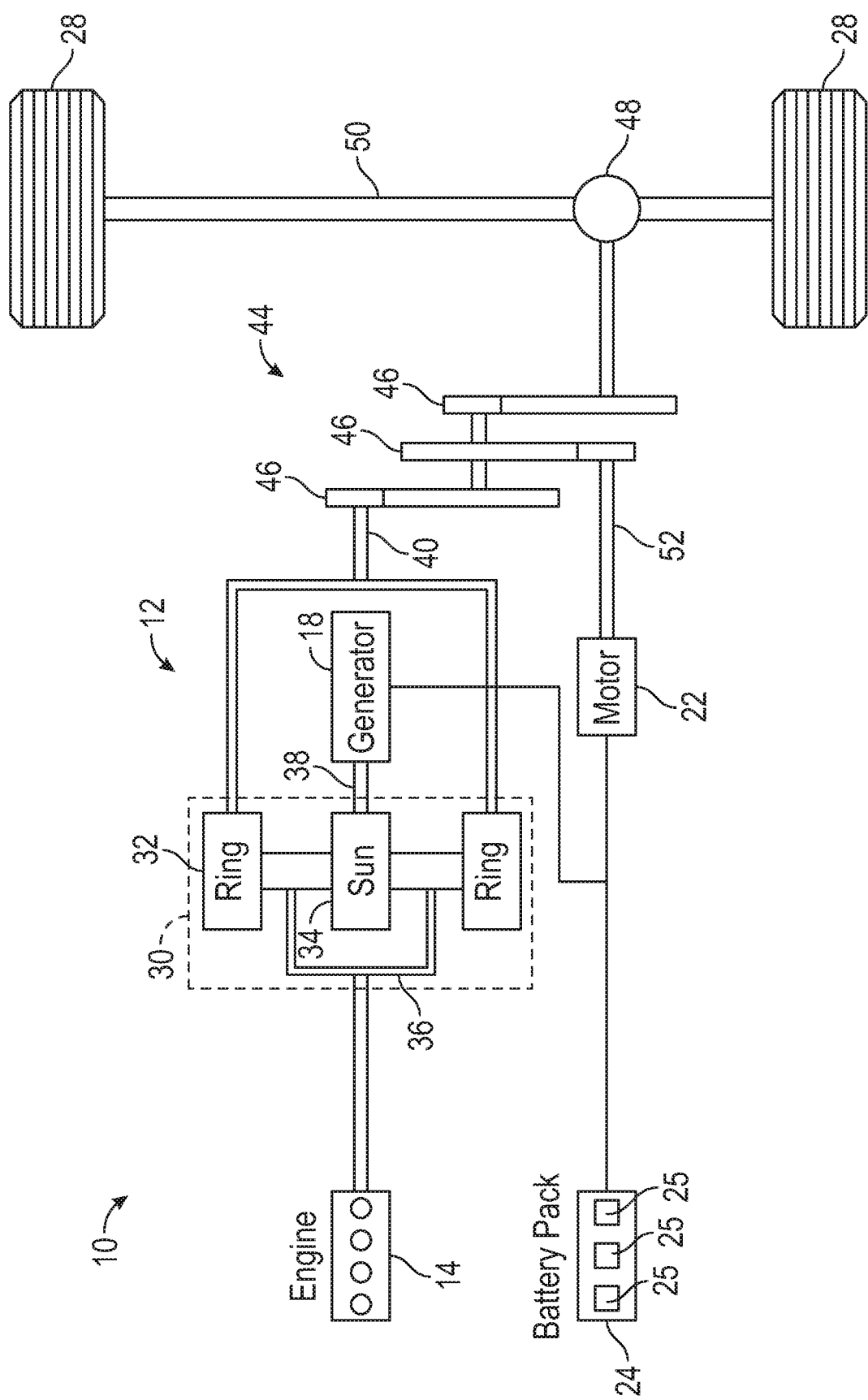
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
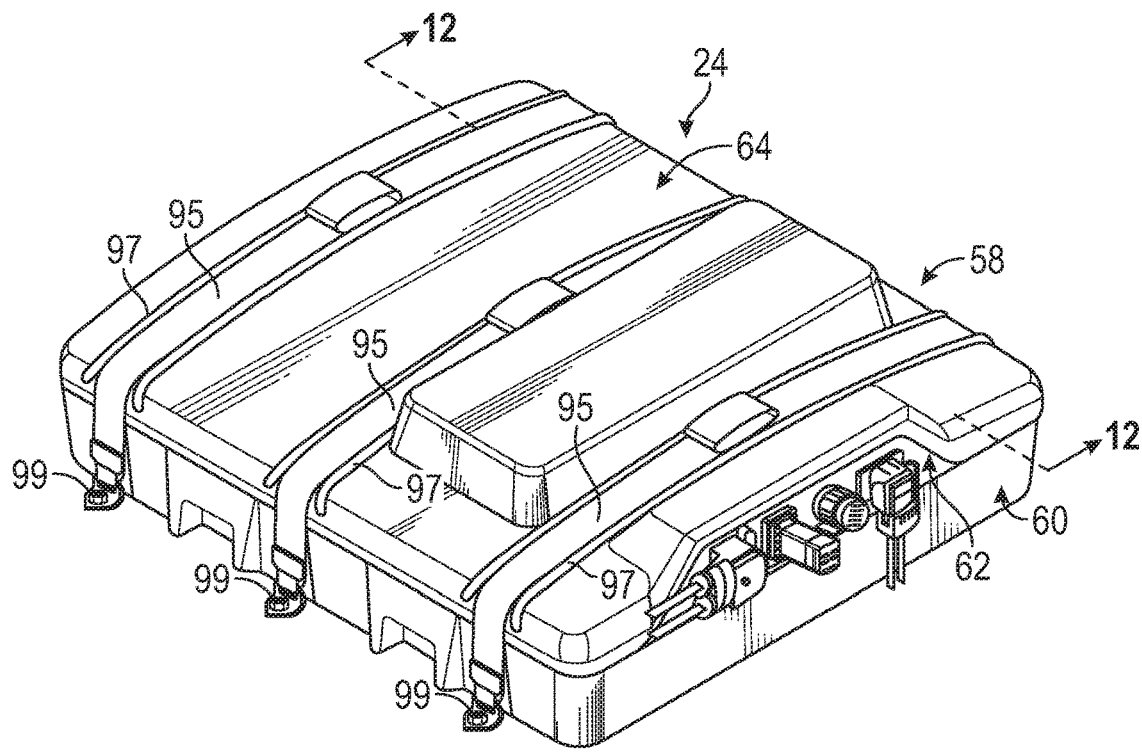
FIG. 2 illustrates a battery pack of an electrified vehicle.
Figure 3:
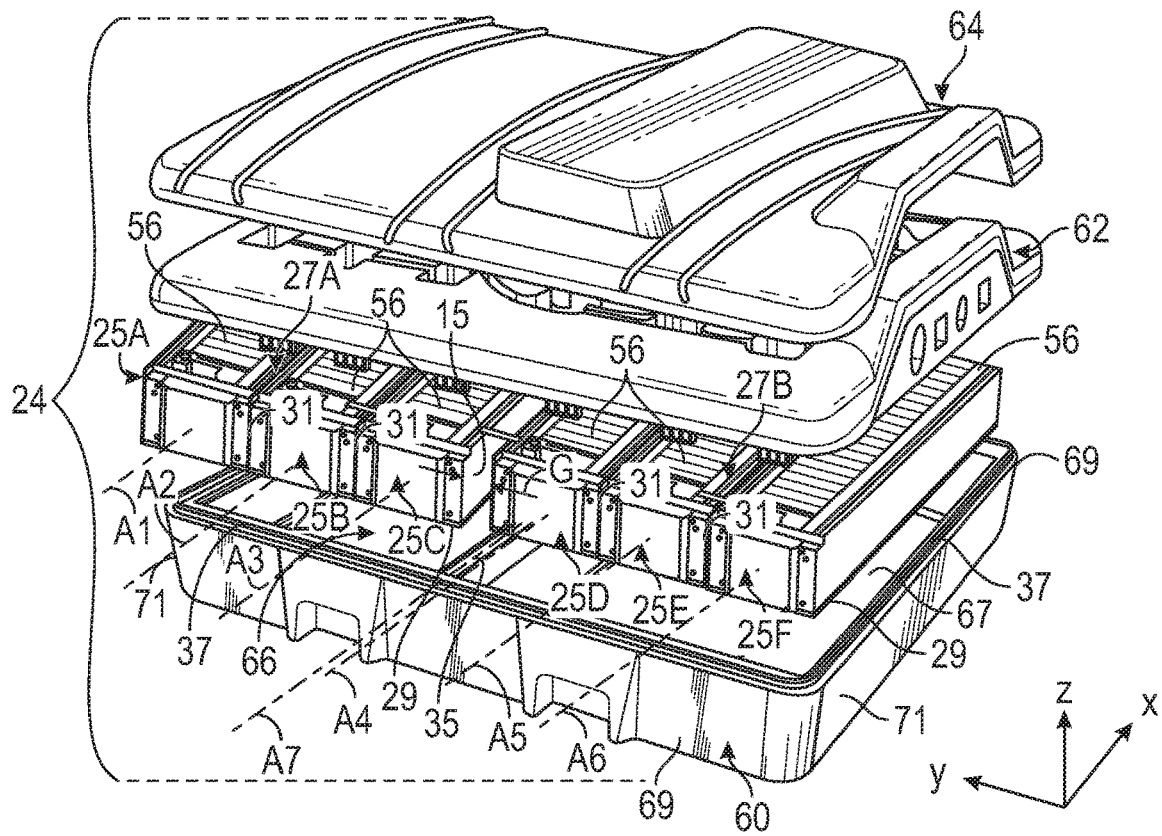
FIG. 3 is an exploded view of the battery pack of FIG. 2.

FIGS. 2 and 3 schematically illustrate a battery pack 24 that can be employed within an electrified vehicle. For example, the battery pack 24 could be part of the powertrain 10 of the electrified vehicle 12 of FIG. 1. FIG. 2 is a perspective view of the battery pack 24, and FIG. 3 is an exploded view of the battery pack 24 for better illustrating the internal components of the battery pack 24.

The battery pack 24 houses a plurality of battery cells 56 (see FIG. 3) that store energy for powering various electrical loads of the electrified vehicle 12. The battery pack 24 could employ any number of battery cells within the scope of this disclosure. Thus, this disclosure is not limited to the exact configuration shown in FIG. 3.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array or battery assembly. The battery pack 24 depicted in FIG. 3 includes a first battery array 25A, a second battery array 25B, a third battery array 25C, a fourth battery array 25D, a fifth battery array 25E, and a sixth battery array 25F. Although the battery pack 24 is depicted as including six battery arrays 25, the battery pack 24 could include a greater or fewer number of battery arrays and still fall within the scope of this disclosure. Unless stated otherwise herein, when used without any alphabetic identifier immediately following the reference numeral, reference numeral "25" may refer to any of the battery arrays 25A-25F.

The battery cells 56 of the first battery array 25A are distributed along a first longitudinal axis A1, the battery cells 56 of the second battery array 25B are distributed along a second longitudinal axis A2, the battery cells 56 of the third battery array 25C are distributed along a third longitudinal axis A3, the battery cells 56 of the fourth battery array 25D are distributed along a fourth longitudinal axis A4, the battery cells 56 of the fifth battery array 25E are distributed along a fifth longitudinal axis A5, and the battery cells 56 of the sixth battery array 25F are distributed along a sixth longitudinal axis A6. In an embodiment, the longitudinal axes A1 through A6 are laterally spaced from one another once the battery arrays 25 are positioned inside the battery pack 24.

In an embodiment, the battery arrays 25A, 25B, and 25C are grouped together to establish a first battery array assembly 27A, and the battery arrays 25D, 25E, and 25F are grouped together to establish a second battery array assembly 27B. In addition to including one or more battery arrays 25, each battery array assembly 27A, 27B may include a heat exchanger plate 29 (i.e., a cold plate) and one or more foam spacers 31 that are disposed between adjacent battery arrays 25 of each battery array assembly 27A, 27B. Although each battery array assembly 27A, 27B is shown including three battery arrays, it should be understood that the battery array assemblies 27A, 27B could include one or more battery arrays 25.

Each battery array 25 of the battery pack 24 may be positioned relative to the heat exchanger plate 29 such that the battery cells 56 are either in direct contact with or in close proximity to the heat exchanger plate 29. The heat exchanger plates 29 may be part of a liquid cooling system that is associated with the battery pack 24 and is configured for thermally managing the battery cells 56 of each battery array 25. For example, heat may be generated and released by the battery cells 56 during charging operations, discharging operations, extreme ambient conditions, or other conditions. It may be desirable to remove the heat from the battery pack 24 to improve capacity, life, and performance of the battery cells 56. The heat exchanger plates 29 are configured to conduct the heat out of the battery cells 56. In other words, the heat exchanger plates 29 acts as heat sinks for removing heat from the heat sources (i.e., the battery cells 56). The heat exchanger plates 29 could alternatively be employed to heat the battery cells 56, such as during extremely cold ambient conditions, for example.

An enclosure assembly 58 houses each battery array 25 of the battery pack 24. In an embodiment, the enclosure assembly 58 is a sealed enclosure. The enclosure assembly 58 may include any size, shape, and configuration within the scope of this disclosure.

In an embodiment, the enclosure assembly 58 includes a tray 60, a mid-tray 62, and a cover 64. The tray 60, the mid-tray 62, and the cover 64 cooperate to surround and enclose the battery arrays 25.

The tray 60 provides an open area 66 for holding the battery array assemblies 27A, 27B. In an embodiment, the battery array assemblies 27A, 27B are positionable within the open area 66 of the tray 60. The open area 66 may be established by a floor 67, opposing side walls 69, and opposing side walls 71 (which connect between the opposing side walls 69) of the tray 60. In an embodiment, the opposing side walls 69, 71 protrude upwardly from the outer perimeter of the floor 67.

The mid-tray 62 may be seated and sealed onto the tray 60, such as via a tongue and groove connection (discussed in greater detail below with reference to FIGS. 8-11). The mid-tray 62 may be approximately the same width and length as the tray 60 such that it engages up to four sides of the tray 60 when seated. The cover 64 may next be seated over the mid-tray 62 and sealed to it to enclose the battery array assemblies 27A, 27B. Once both are secured in their respective positions, the mid-tray 62 and the cover 64 may be received together in a nesting fashion.

As shown in FIG. 2, a portion of the mid-tray 62 may be exposed outside of the enclosure assembly 58. However, the mid-tray 62 could alternatively be completely housed inside the enclosure assembly 58.

The enclosure assembly 58 could have other configurations within the scope of this disclosure. For instance, the mid-tray 62, the cover 64, or both could provide some of the open area 66 for receiving the battery arrays 25. In addition, although shown as being substantially rectangular, the enclosure assembly 58 could be triangular, round, square, etc.

In an embodiment, the tray 60 and the mid-tray 62 are constructed (e.g., molded) of an expanded polymer-based material, and the cover 64 is constructed (e.g., molded) of a solid polymer-based material. In another embodiment, the cover 64 is also constructed from an expanded polymer-based material. In yet another embodiment, the cover 64 is constructed from a metallic material. In yet another embodiment, the tray 60 is constructed from a solid polymer based material or a metallic based material.

Exemplary expanded polymer-based materials can include, but are not limited to, expanded polypropylene, expanded polystyrene, and expanded polyethylene. Generally, these polymer-based materials are considered relatively structural foamed polymer-based materials.

Exemplary solid polymer-based materials can include, but are not limited to, sheet moulding compounds (e.g., glass-fiber reinforced polyester), polypropylene, and polyamine Generally, these polymer-based materials are considered more rigid than the expanded polymer based materials discussed above.

In an embodiment, the battery pack 24 is retained to a vehicle body of the electrified vehicle 12 by one or more straps 95. The straps 95 may be received within grooves 97 formed in the cover 64 of the enclosure assembly 58 and may be fastened to the vehicle body by fasteners 99.

Figure 4:
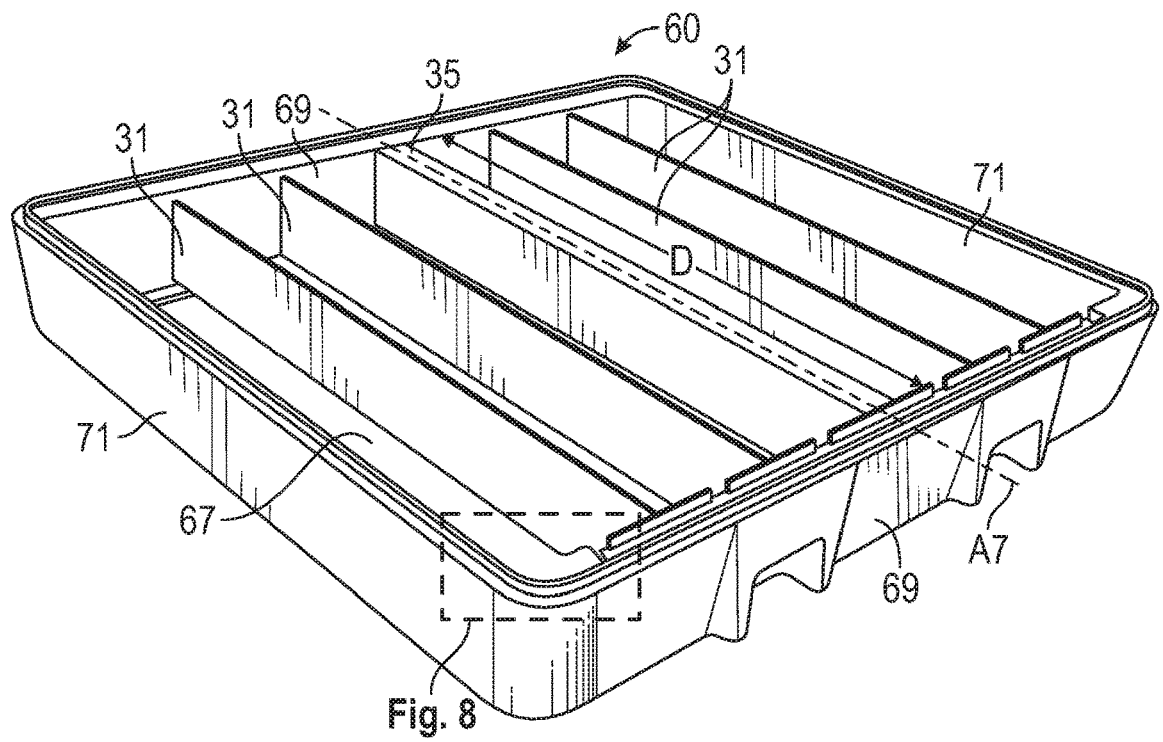
FIG. 4 illustrates a tray of the battery pack of FIG. 2.

Referring now to FIGS. 3 and 4, another foam spacer 35 may be positioned between the first battery array assembly 27A and the second battery array assembly 27B. In an embodiment, the foam spacer 35 is positioned near a center of the tray 60 and extends along a longitudinal axis A7 that is parallel to the axes A1-A7 of the battery arrays 25. The foam spacer 35 may span an entire distance D between the opposing side walls 69 of the tray 60. The foam spacer 35 may additionally fill an entire gap G (see FIG. 3) that extends between the first battery array assembly 27A and the second battery array assembly 27B.

The foam spacers 31 that are disposed between adjacent battery arrays 25 of each battery array assembly 27A, 27B may extend in parallel with the longitudinal axis A7 of the foam spacer 35. Each foam spacer 31 may additionally extend the entire distance D between the opposing side walls 69 of the tray 60.

In yet another embodiment, additional foam spacers 37 may be disposed between the side walls 71 of the tray 60 and each of the first and second battery array assemblies 27A, 27B. The foam spacers 37 may also extend in parallel with the longitudinal axis A7 of the foam spacer 35. Each foam spacer 37 may additionally extend the entire distance D between the opposing side walls 69 of the tray 60.

In an embodiment, the foam spacers 31, 35, and 37 are at least as long as the battery arrays 25. However, the exact dimensions of the foam spacers 31, 35, and 37 are not intended to limit this disclosure.

Once the battery array assemblies 27A, 27B are positioned atop the floor 67 of the tray 60, the foam spacer 35 fills the space between the battery array assemblies 27A, 27B, the foam spacers 37 fill the space between the far left and far right sides of tray 60 and the battery array assemblies 27A, 27B, and the foam spacers 31 fill the spaces between adjacent battery arrays 25 of the battery array assemblies 27A, 27B. Therefore, all of the parts that are installed onto the tray 60 are fitted together with little to no gap or clearance therebetween. As discussed in greater detail below, this gapless arrangement between the internals parts of the battery pack 24 helps transfer loads inside the battery pack 24 during impact events and also helps dampen and transfer durability loads.

The side walls 69 and the side walls 71 of the tray 60 retain the battery array assemblies 27A, 27B in the X-axis and Y-axis directions, respectively. The tray 60 may additionally include snap-in features that are molded into the floor 67 and the side walls 69, 71 of the tray 60 for retaining the battery array assemblies 27A, 27B in the Z-axis direction.

Figure 5A:
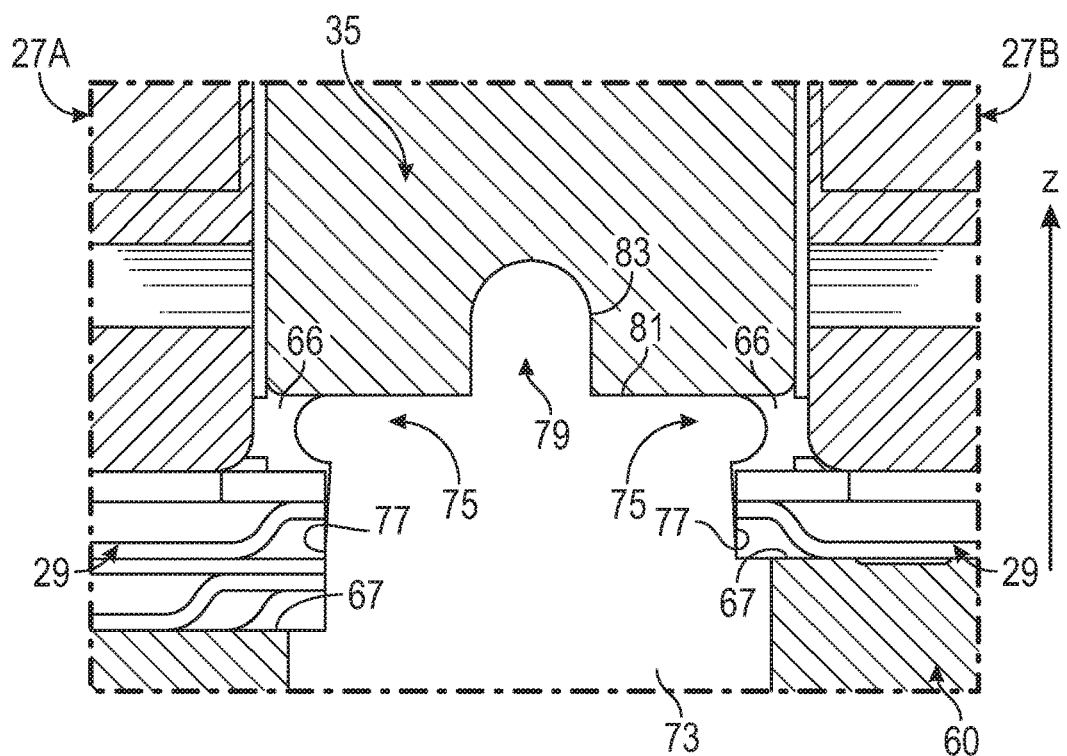
FIGS. 5A and 5B illustrate exemplary snap-in retaining features of the tray of FIG. 4.

For example, as shown in FIG. 5A, a beam 73 may protrude upwardly from the floor 67 of the tray 60. The beam 73 may include protrusions 75 that protrude outwardly from walls 77. As the battery array assemblies 27A, 27B are lowered into the open area 66 of the tray 60 in a direction toward the floor 67, the heat exchanger plates 29 are snap-fit into place under the protrusions 75 in order to retain the battery array assemblies 27A, 27B from further movement in the Z-axis direction.

An additional protrusion 79 may protrude upwardly from an upper surface 81 of the beam 73. The protrusion 79 acts as an alignment feature for securing the foam spacer 35 relative to the tray 60. The protrusion 79 may be guided into a slot 83 of the foam spacer 35 as the foam spacer 35 is pushed into the protrusion 79 in order to retain the foam spacer 35 in the Z-axis direction. Although shown with respect to the foam spacer 35, the foam spacers 31 and foam spacers 37 could be similarly secured to the tray 60.

Figure 5B:
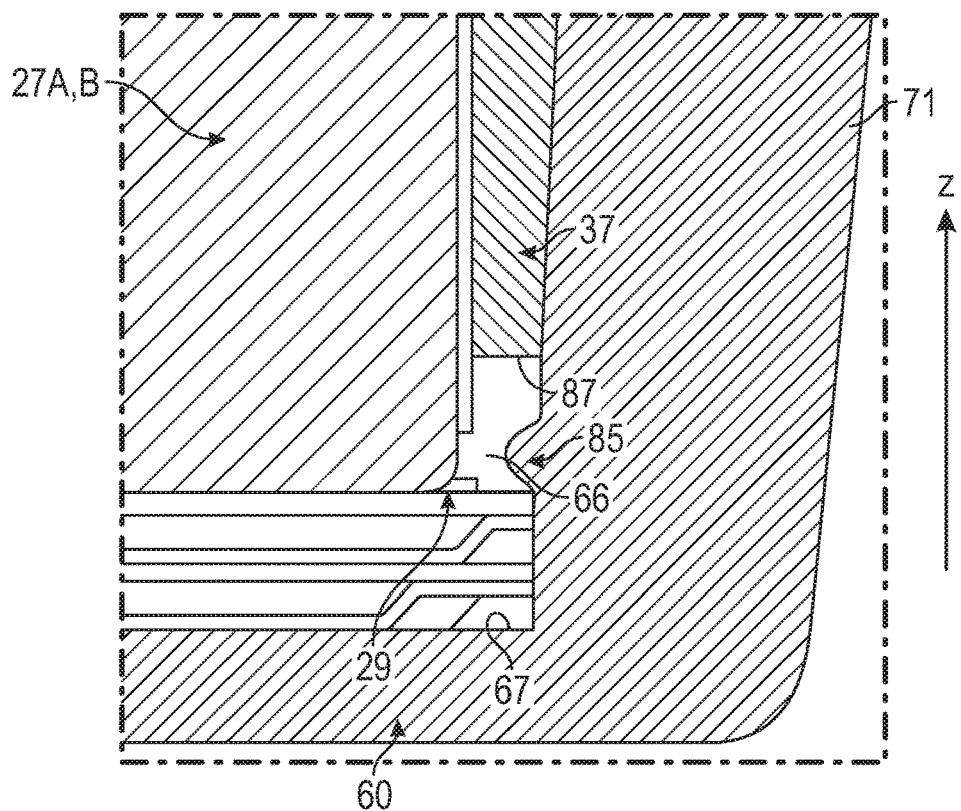

In addition, as shown in FIG. 5B, one or more protrusions 85 may protrude inwardly from the side walls 71 of the tray 60. In an embodiment, the protrusions 85 are located slightly inward from a bottom surface 87 of the foam spacers 37. As the battery array assemblies 27A, 27B are lowered into the open area 66 of the tray 60 in a direction toward the floor 67, the heat exchanger plates 29 are snap-fit into place under the protrusions 85 in order to retain the battery array assemblies 27A, 27B from further movement in the Z-axis direction.

Since the battery array assemblies 27A, 27B and the foam spacer 35 can be mechanically retained in each of the X, Y, and Z-axis directions, there is no need for additional fasteners to retain any of the components within the tray 60.

Figure 6:
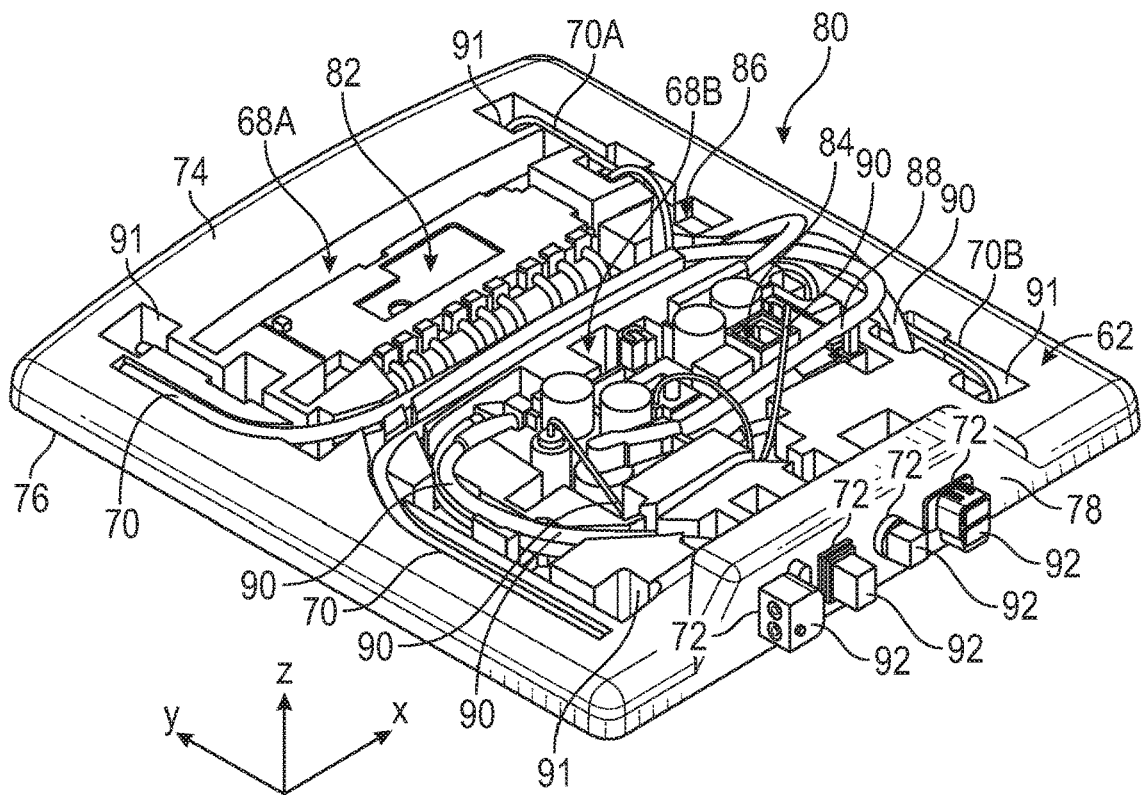
FIG. 6 illustrates a mid-tray of the battery pack of FIG. 2. The mid-tray is shown packaged together with a plurality of internal components for establishing an electrical subassembly.

FIG. 6, with continued reference to FIGS. 2 and 3, illustrates additional details of the mid-tray 62 of the enclosure assembly 58. The mid-tray 62 may include various molded-in features for routing and/or retaining internal components within the mid-tray 62. The size, shape, location, and configuration of the molded-in features shown in FIG. 6 are exemplary only and are not intended to limit this disclosure.

In an embodiment, the mid-tray 62 includes pockets 68A, 68B, channels 70, and core holes 72 that are each designed to accommodate one or more additional internal components of the battery pack 24. The pockets 68A, 68B and the channels 70 may be formed within an upper surface 74 of the mid-tray 62. The upper surface 74 faces toward the cover 64 when the mid-tray 62 is positioned within the enclosure assembly 58. Some of the pockets 68 or the channels 70 could extend through or be formed in a lower surface 76 of the mid-tray 62. The core holes 72 may be formed through a side wall 78 of the mid-tray 62. In another embodiment, the core holes 72 are formed through a trough in the upper surface 74 or the lower surface 76 of the mid-tray 62. In yet another embodiment, the core holes 72 may have a slot cut into them from the top edge to the hole for sliding internal components into the core holes 72.

The mid-tray 62 and a plurality of internal components (see features 82 through 88) may be packaged together to establish an electrical subassembly 80 of the battery pack 24. The mid-tray 62 and the internal components can be preassembled together to form the electrical subassembly 80 before final assembly of the enclosure assembly 58. In this way, the mid-tray 62 and the internal components are already packaged together when the enclosure assembly 58 is assembled during manufacturing. Thus, the electrical subassembly 80 increases line efficiency by allowing the mid-tray 62 and the internal components to be assembled in parallel with the rest of the battery pack 24, thereby decreasing manufacturing complexity and cost.

In an embodiment, the internal components that may be packaged within the mid-tray 62 include a bussed electrical center (BEC) 82, a battery electric control module (BECM) 84, a first wiring harness 86, a second wiring harness 88, a plurality of wiring looms 90, and a plurality of I/O connectors 92. Of course, other internal components could also be retained within the mid-tray 62. The BEC 82 and the BECM 84 may be secured within respective pockets 68A, 68B of the mid-tray 62, the wiring harnesses 86, 88 and the wiring looms 90 may be secured within respective channels 70 of the mid-tray 62, and the I/O connectors 92 may be secured within respective core holes 72 of the mid-tray 62.

The internal components 82-88 may be routed and/or retained within the mid-tray 62 to assemble the electrical subassembly 80 in the following non-limiting manner First, the BEC 82 is inserted into the first pocket 68A and the BECM 84 is inserted into the second pocket 68B of the mid-tray 62. The first wiring harness 86 is next inserted into a channel 70A of the mid-tray 62 and is connected to the BEC 82. The wiring looms 90 are then routed through their respective channels 70, snaked through one of the core holes 72, and then connected to one of the I/O connectors 92. Alternatively, the I/O connectors 92 may be pre-assembled to the wiring looms 92 in which case the assembly process would include feeding the wiring looms 90 through the core holes 72 first and then positioning the wiring looms 90 within their respective channels 70. Finally, the second wiring harness 88 is inserted into a channel 70B of the mid-tray 62 and is connected to the BECM 84.

In another embodiment, the pockets 68A, 68B and the channels 70 each include finger clearances 91 that are molded into the mid-tray 62. The finger clearances 91 make it easier for an assembly worker to route and retain the electronic components 82-88 relative to the mid-tray 62 during the assembly process.

Figure 7A:
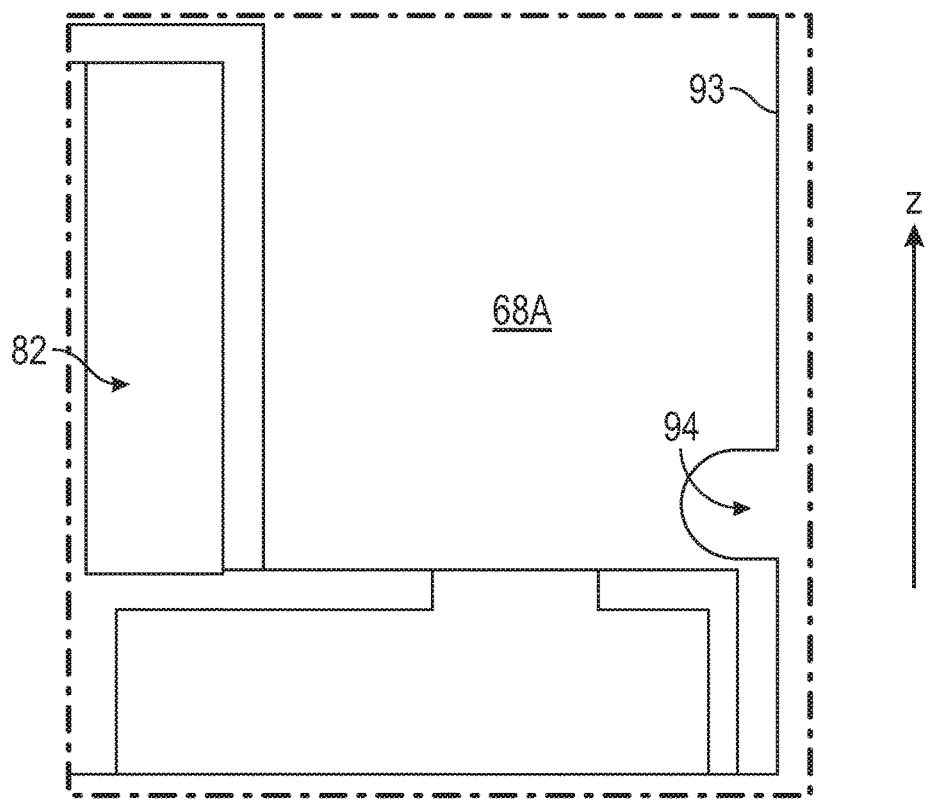
FIGS. 7A and 7B illustrate exemplary snap-in retaining features of the mid-tray of FIG. 6.
Figure 7B:
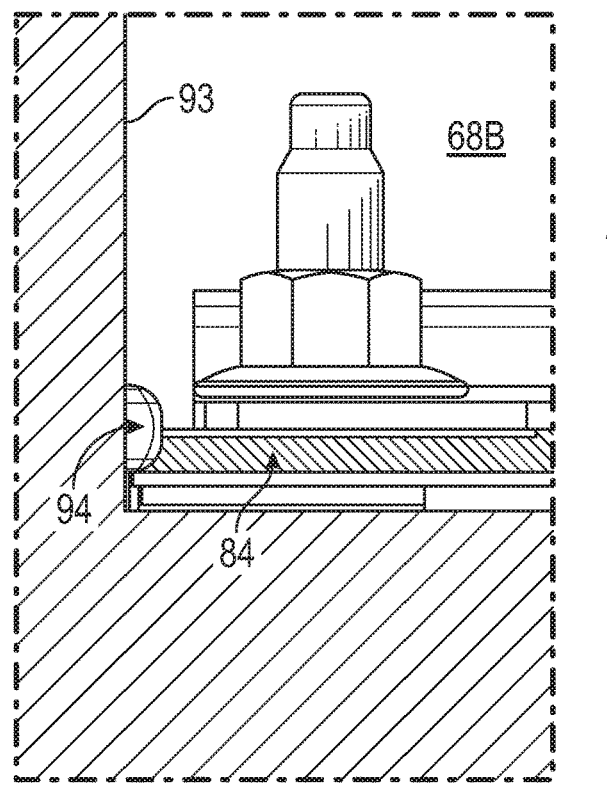
Figure 8:
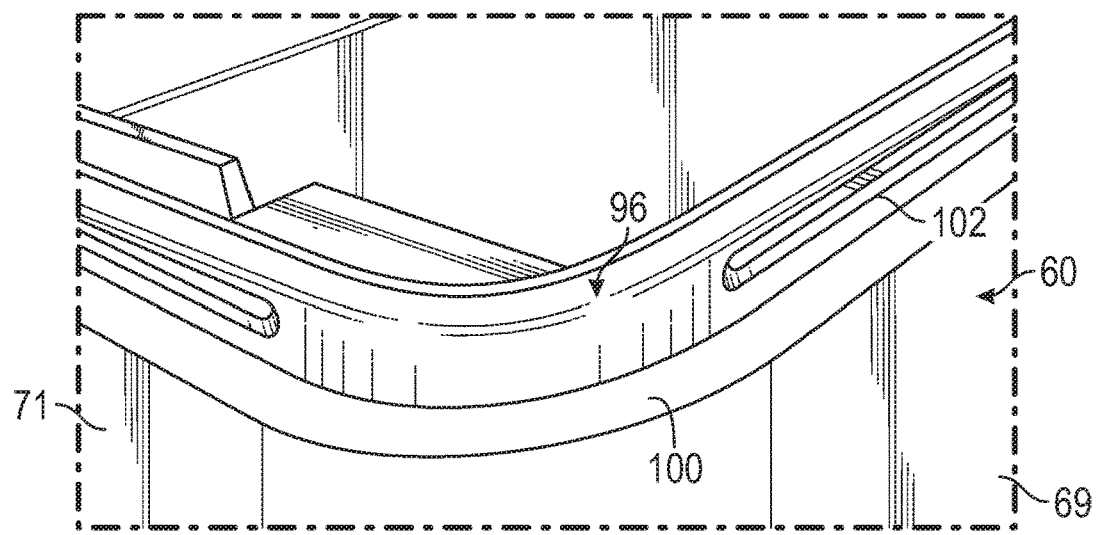
FIG. 8 is a blown-up view of a portion of the tray of FIG. 4.
Figure 9:
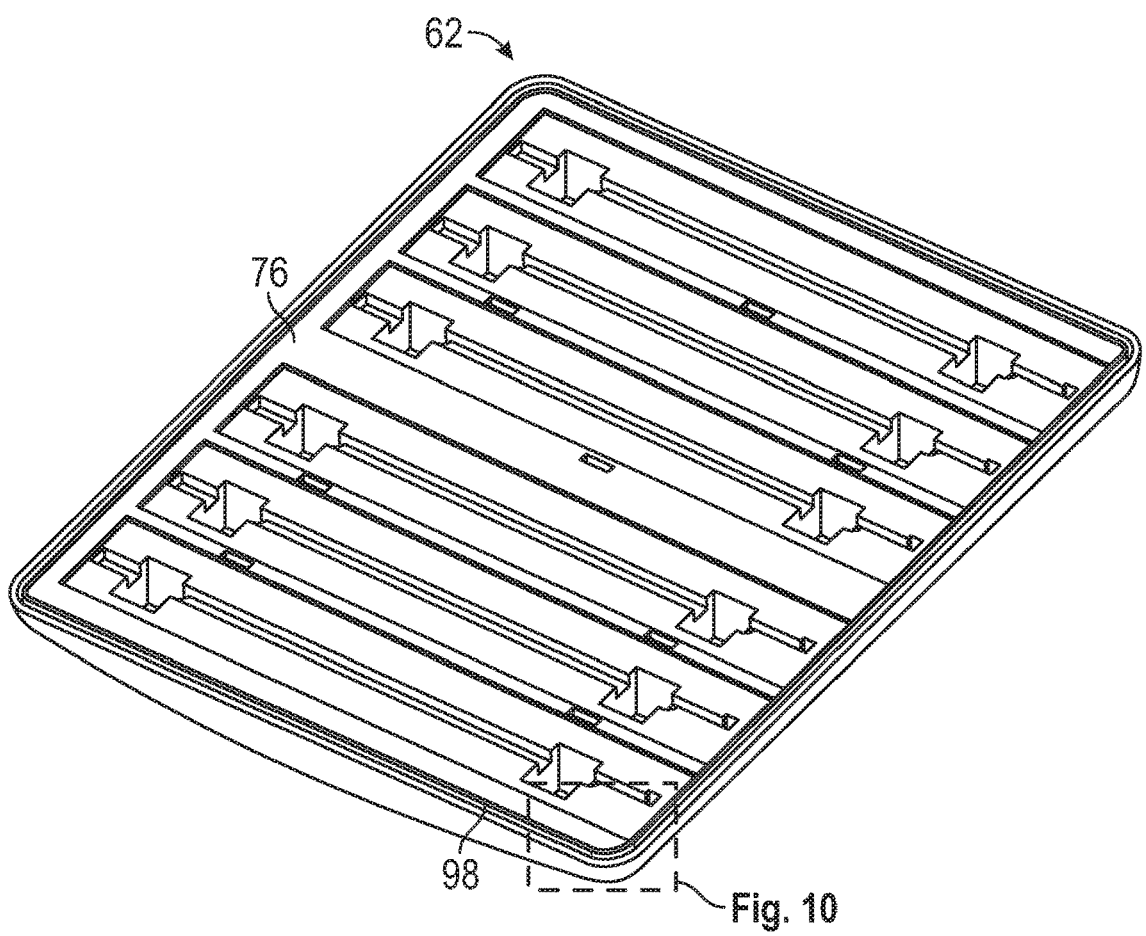
FIG. 9 illustrates a lower surface of the mid-tray of FIG. 6.
Figure 10:
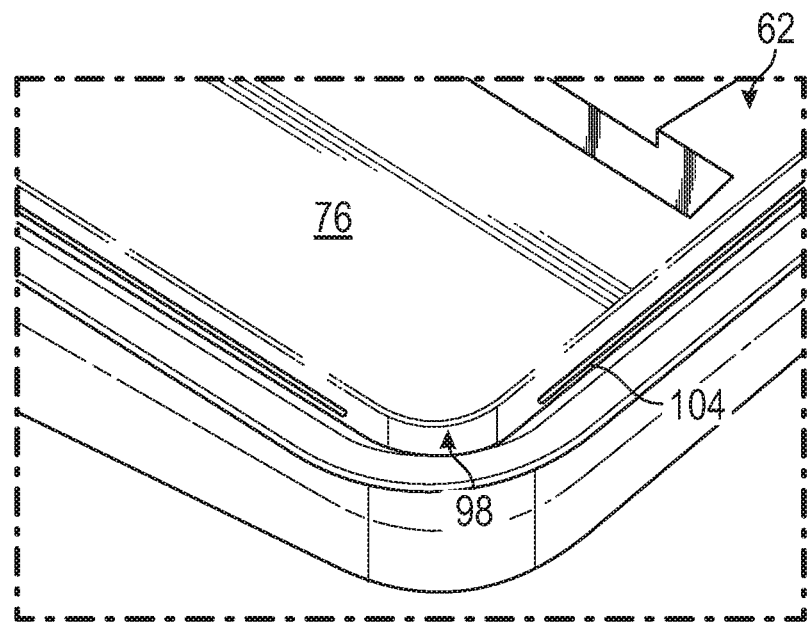
FIG. 10 is a blown-up view of a portion of the mid-tray of FIG. 9.

Each of the first pocket 68A and the second pocket 68B may include pocket walls 93 (see FIGS. 7A and 7B) for retaining the internal components (here, features 82 and 84) in the X and Y-axis directions. The first and second pockets 68A, 68B may additionally include snap-in features that are molded into the pocket walls 93 for retaining the internal components in the Z-axis direction. For example, as shown in FIGS. 7A and 7B, one or more protrusions 94 may protrude inwardly from the pocket walls 93. As the BEC 82 and the BECM 84 are inserted into the pockets 68A, 68B, respectively, these components are snap-fit into place and retained from further movement in the Z-axis direction. The first and second wiring harnesses 86, and the wiring looms 90 could be similarly retained in the Z-axis direction via one or more snap-fit features.

Since the internal components of the electrical subassembly 80 are mechanically retained in the X, Y, and Z-axis directions, there is no need for additional fasteners to retain any of the components within the mid-tray 62.

FIGS. 8-11, with continued reference to FIGS. 2-4, illustrate a tongue and groove connection for seating and sealing the mid-tray 62 onto the tray 60. In an embodiment, a tongue 96 of the tongue and groove connection is provided by the tray 60 and a groove 98 of the tongue and groove connection is provided by the mid-tray 62. However, an opposite configuration is also contemplated within the scope of this disclosure in which the tongue 96 of the tongue and groove connection is provided by the mid-tray 62 and the groove 98 of the tongue and groove connection is provided by the tray 60.

The tongue 96 may protrude upwardly from a lip 100 established by the side walls 69, 71 of the tray 60. The tongue 96 may extend about an entire perimeter of the lip 100. A protrusion 102 may extend from each side of the tongue 96. The groove 98 may be formed in the lower surface 76 of the mid-tray 62. The groove 98 may extend about an entire outer perimeter of the lower surface 76. A slot 104 may extend from each side of the groove 98.

Figure 11:
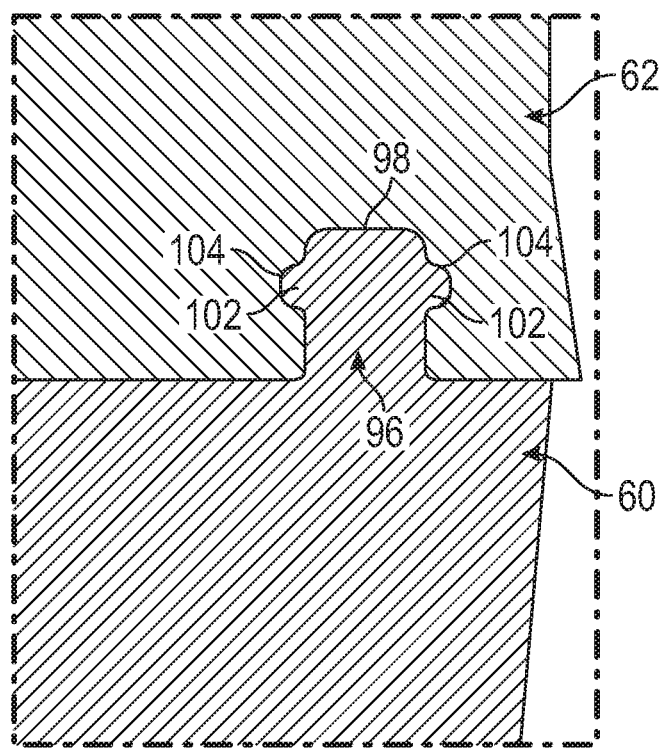
FIG. 11 illustrates a tongue and groove connection between the mid-tray of FIG. 6 and the tray of FIG. 4.

Referring now to FIG. 11, the tongue 96 may be received within the groove 98 as the mid-tray 62 is moved downwardly against the tray 60. As the mid-tray 62 is moved against the tray 60, the protrusions 102 of the tongue 96 are snap-fit into the slots 104 of the groove 98, thereby installing the mid-tray 62 onto the tray 60.

Figure 12:
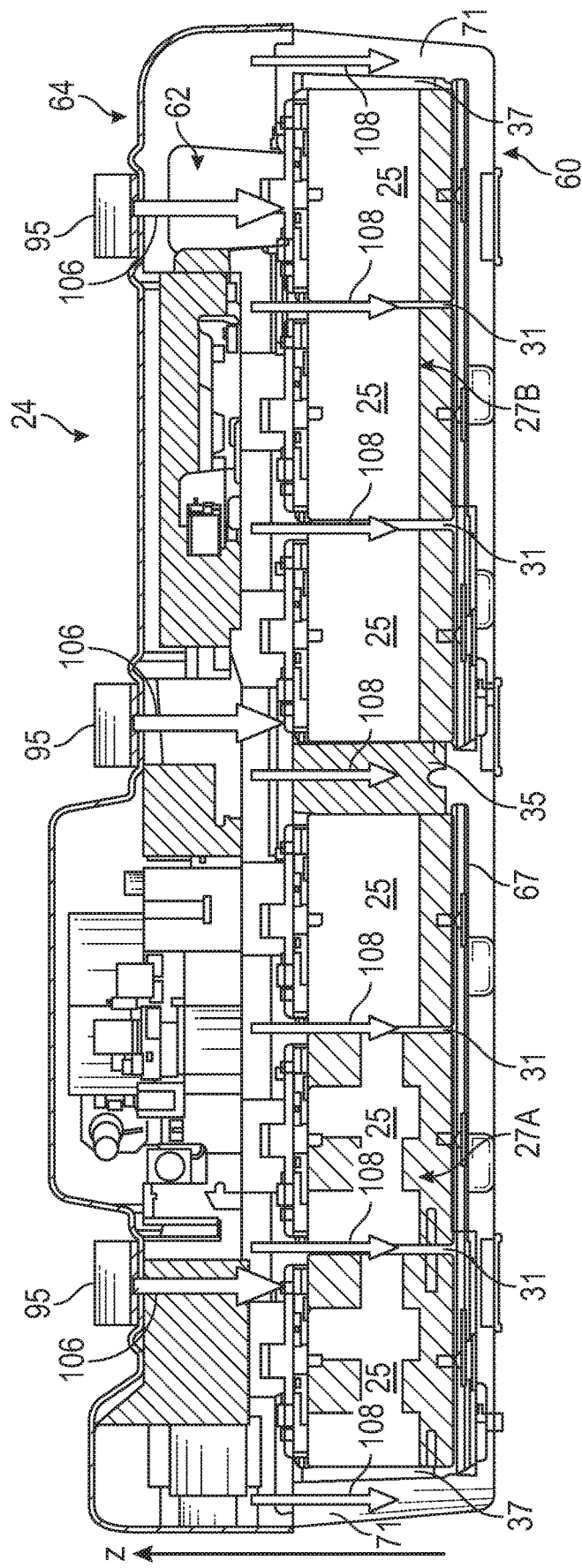
FIG. 12 is a cross-sectional view of the battery pack of FIG. 2 and schematically illustrates an exemplary load transfer path through the battery pack.

FIG. 12 is a cross-sectional view through section 12-12 of FIG. 2 and schematically illustrates a load transfer path for transferring vehicle impact loads inside the battery pack 24. As detailed above, the spaces between adjacent battery arrays 25 are filled by the foam spacers 31, the space between the battery array assemblies 27A, 27B is filled by the foam spacer 35, and the spaces between the battery array assemblies 27A, 27B and the side walls 71 of the tray 60 are filled by the foam spacers 37. The foam spacers 31, 35, and 37 are configured to transfer loads in X and Y-axis directions and to dampen energy during vehicle impact events and spikes in durability road loads.

FIG. 12 depicts the load transfer path in the Z-axis direction. In an embodiment, loads are distributed from the straps 95 to the cover 64 and then to the mid-tray 62 (see arrows 106). From the mid-tray 62, the loads may next transfer through the battery arrays 25, the foam spacers 31, 35, and 37, and the side walls 69, 71 and floor 67 of the tray 60 (see arrows 108). The load transfer path may help retain the battery array assemblies 27A, 27B relative to the tray 60. Advantageously, the proposed retention and load transfer configuration of the battery pack 24 eliminates the need for brackets for attaching the battery arrays 25 to the tray 60.

The exemplary battery packs of this disclosure include enclosure assemblies that incorporate features for both retaining components and transferring loads inside the battery pack. The proposed designs reduce the number of overall parts, such as fasteners and brackets, in assembly, increase energy absorption and electrical insulation capabilities of the battery pack, and simplify the overall battery pack manufacturing process.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly including a tray and a cover, wherein the tray includes a floor and a first opposing side wall and a second opposing side wall that both protrude upwardly from the floor;
a first foam spacer secured to the tray and extending from the first opposing side wall to the second opposing side wall, and
a beam protruding upwardly from the floor of the tray, wherein the beam includes a first protrusion that protrudes upwardly from an upper surface of the beam, wherein the first protrusion extends into a slot of the first foam spacer to retain the first foam spacer to the tray.

2. The battery pack as recited in claim 1, wherein the tray is an expanded polymer-based tray and the cover is a solid polymer-based cover.

3. The battery pack as recited in claim 1, wherein the enclosure assembly includes a mid-tray.

4. The battery pack as recited in claim 3, comprising a plurality of internal components secured within the mid-tray to establish an electrical subassembly within the enclosure assembly.

5. The battery pack as recited in claim 4, wherein the plurality of internal components include a bussed electrical center (BEC) secured within a first pocket of the mid-tray and a battery electric control module (BECM) secured within a second pocket of the mid-tray.

6. The battery pack as recited in claim 5, wherein the BEC and the BECM are retained in an X-axis direction and a Y-axis direction by pocket walls of the mid-tray and are retained in a Z-axis direction by protrusions that protrude inwardly from the pocket walls.

7. The battery pack as recited in claim 1, wherein the enclosure assembly includes a mid-tray, and the mid-tray is secured and sealed to the tray by a tongue and groove connection.

8. The battery pack as recited in claim 1, comprising a second foam spacer located between a first battery array assembly and a third opposing side wall of the tray and a third foam spacer located between a second battery array assembly and a fourth opposing side wall of the tray.

9. The battery pack as recited in claim 8, comprising a fourth foam spacer located between a first battery array and a second battery array of the first battery array assembly and a fifth foam spacer located between a third battery array and a fourth battery array of the second battery array assembly.

10. The battery pack as recited in claim 1, comprising a second foam spacer located between a first battery array and a second battery array of a first battery array assembly and a third foam spacer located between a third battery array and a fourth battery array of a second battery array assembly.

11. The battery pack as recited in claim 1, wherein a first battery array assembly is retained to the tray by a first protrusion of the tray, and a second battery array assembly is retained to the tray by a second protrusion of the tray.

12. The battery pack as recited in claim 11, wherein a first heat exchanger plate of the first battery array assembly is snap-fit into place under the first protrusion and a second heat exchanger plate of the second battery array assembly is snap-fit under the second protrusion to retain the first and second battery array assemblies in a Z-axis direction.

13. The battery pack as recited in claim 1, wherein the first foam spacer is push-retained to the tray.

14. The battery pack as recited in claim 13, wherein the first foam spacer is located between adjacent battery arrays, between a battery array and a wall of the tray, or between adjacent battery array assemblies.

15. The battery pack as recited in claim 1, wherein the first opposing side wall and the second opposing sidewall protrude upwardly at an outermost perimeter of the floor.

16. The battery pack as recited in claim 1, wherein the tray establishes an outermost base of the battery pack.

17. The battery pack as recited in claim 1, wherein the first foam spacer is located between a first battery array assembly and a second battery array assembly of the battery pack, wherein the first battery array assembly include a first grouping of battery cells that are stacked together along a first longitudinal axis, the second battery array assembly includes a second grouping of battery cells that are stacked together along a second longitudinal axis, and the first foam spacer extends along a third longitudinal axis, and further wherein the first longitudinal axis, the second longitudinal axis, and the third longitudinal axis are each parallel to one another.

18. The battery pack as recited in claim 17, wherein the first battery array assembly, the first foam spacer, and the second battery array assembly establish a substantially gapless arrangement inside the enclosure assembly.

19. The battery pack as recited in claim 1, wherein the first protrusion includes a first width that is less than a second width of the beam, and further wherein the beam includes a second protrusion that protrudes outwardly from a first wall of the beam and a third protrusion that protrudes outwardly from a second wall of the beam.

20. The battery pack as recited in claim 19, wherein the second protrusion extends over a first heat exchange plate of a first battery array assembly of the battery pack and the third protrusion extends over a second heat exchanger plate of a second battery array assembly of the battery pack.

* * * * *